United States Patent
Durand et al.

(10) Patent No.: US 11,333,020 B2
(45) Date of Patent: May 17, 2022

(54) FEEDBACK DEVICE WITH NON-AXIALLY ALIGNED POSITION MARKERS

(71) Applicant: PRATT & WHITNEY CANADA CORP., Longueuil (CA)

(72) Inventors: Sean Durand, Brossard (CA); Richard Kudrna, Carignan (CA); Ian Farrell, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 177 days.

(21) Appl. No.: 16/739,044

(22) Filed: Jan. 9, 2020

(65) Prior Publication Data
US 2020/0378259 A1    Dec. 3, 2020

Related U.S. Application Data

(60) Provisional application No. 62/854,995, filed on May 31, 2019.

(51) Int. Cl.
*B64C 11/30*  (2006.01)
*F01D 5/02*  (2006.01)
*B64D 31/00*  (2006.01)
*G01B 7/30*  (2006.01)

(52) U.S. Cl.
CPC .............. *F01D 5/02* (2013.01); *B64D 31/00* (2013.01); *G01B 7/30* (2013.01); *F05D 2240/30* (2013.01); *F05D 2270/80* (2013.01)

(58) Field of Classification Search
CPC ..... F01D 5/02; F01D 7/00; F01D 7/02; B64C 11/301; B64C 11/30; B64D 27/10; B64D 31/00; G01B 7/30; F05D 2270/80
See application file for complete search history.

(56) References Cited

U.S. PATENT DOCUMENTS

| 4,532,493 | A | | 7/1985 | Sibeud |
| 5,248,938 | A | * | 9/1993 | Kobayashi ............... G01B 7/30 |
| | | | | 310/68 B |
| 6,269,926 | B1 | | 8/2001 | Lemoine et al. |
| 2018/0050816 | A1 | * | 2/2018 | Yakobov ............... B64C 11/301 |

FOREIGN PATENT DOCUMENTS

| EP | 2876046 | 5/2015 |
| EP | 3284665 | 2/2018 |
| EP | 3284666 | 2/2018 |
| EP | 3396304 | 10/2018 |
| GB | 2465575 | 5/2010 |

* cited by examiner

*Primary Examiner* — David E Sosnowski
*Assistant Examiner* — Maxime M Adjagbe
(74) *Attorney, Agent, or Firm* — Norton Rose Fulbright Canada LLP (57) ABSTRACT

A blade angle feedback assembly for an aircraft-bladed rotor is provided. The rotor is rotatable about a longitudinal axis and has an adjustable blade pitch angle. The assembly comprises a feedback device coupled to rotate with the rotor with adjustment of the blade pitch angle, the feedback device having a root surface, a plurality of position makers circumferentially disposed on the root surface, the plurality of position markers circumferentially spaced from one another and non-aligned with the longitudinal axis, and at least one sensor mounted adjacent the feedback device and configured to detect a passage of the plurality of position markers as the feedback device rotates about the longitudinal axis.

20 Claims, 6 Drawing Sheets

FEEDBACK DEVICE WITH NON-AXIALLY ALIGNED POSITION MARKERS

CROSS REFERENCE TO RELATED APPLICATIONS

This patent application claims priority of U.S. provisional Application Ser. No. 62/854,995, filed on May 31, 2019, the entire contents of which are hereby incorporated by reference.

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. The feedback device has multiple readable raised markers disposed on an outer surface thereof, and a sensor can be used to measure the rotation of the feedback device via the markers, providing a proxy value for the rotational velocity of the engine, as well as measure blade angle. The configuration of existing feedback devices however results in reduced signal quality, in addition to requiring complex and costly manufacture.

Therefore, improvements are needed.

SUMMARY

In accordance with a broad aspect, there is provided a blade angle feedback assembly for an aircraft-bladed rotor, the rotor rotatable about a longitudinal axis and having an adjustable blade pitch angle, the assembly comprising a feedback device coupled to rotate with the rotor with adjustment of the blade pitch angle, the feedback device having a root surface, a plurality of position makers circumferentially disposed on the root surface, the plurality of position markers circumferentially spaced from one another and non-aligned with the longitudinal axis, and at least one sensor mounted adjacent the feedback device and configured to detect a passage of the plurality of position markers as the feedback device rotates about the longitudinal axis.

In some embodiments, the plurality of position markers comprises a first plurality of position markers circumferentially spaced from one another and oriented along a first direction, and at least one second position marker positioned between two adjacent first position markers and oriented along a second direction angled relative to the first direction.

In some embodiments, the feedback device comprises a body made of a non-magnetically permeable material and the plurality of position markers are made of a magnetically permeable material.

In some embodiments, the plurality of position markers are embedded in the feedback device.

In some embodiments, the at least one sensor comprises a first end section and a second end section opposite the first end section, a first magnetic pole provided at the first end section and a second magnetic pole provided at the second end section, and the at least one sensor is mounted adjacent the feedback device with the first and second magnetic poles positioned on either side of the root surface.

In some embodiments, the first and second magnetic poles are configured to align with any given one of the plurality of position markers as the given position marker passes through the sensor.

In some embodiments, the first and second magnetic poles are diamond-shaped.

In some embodiments, the at least one sensor further comprises a first protective bumper and a second protective bumper for preventing damage to the at least one sensor in the event of contact between the feedback device and the at least one sensor, the first bumper surrounding the first magnetic pole and the second bumper surrounding the second magnetic pole.

In some embodiments, the at least one sensor has a C-shaped cross section.

In accordance with another broad aspect, there is provided an aircraft-bladed rotor system, comprising a rotor rotatable by a shaft about a longitudinal axis, the rotor having blades with adjustable blade pitch angle, and a feedback device coupled to rotate with the rotor with adjustment of the blade pitch angle, the feedback device having a root surface, and a plurality of position makers circumferentially disposed on the root surface, the plurality of position markers circumferentially spaced from one another and non-aligned with the longitudinal axis.

In some embodiments, the plurality of position markers comprises a first plurality of position markers circumferentially spaced from one another and oriented along a first direction, and at least one second position marker positioned between two adjacent first position markers and oriented along a second direction angled relative to the first direction.

In some embodiments, the feedback device comprises a body made of a non-magnetically permeable material and the plurality of position markers are made of a magnetically permeable material.

In some embodiments, the plurality of position markers are embedded in the feedback device.

In some embodiments, the system further comprises at least one sensor mounted adjacent the feedback device and configured to detect a passage of the plurality of position markers as the feedback device rotates about the longitudinal axis.

In some embodiments, the at least one sensor comprises a first end section and a second end section opposite the first end section, a first magnetic pole provided at the first end section and a second magnetic pole provided at the second end section, and the at least one sensor is mounted adjacent the feedback device with the first and second magnetic poles positioned on either side of the root surface.

In some embodiments, the first and second magnetic poles are configured to align with any given one of the plurality of position markers as the given position marker passes through the sensor.

In some embodiments, the first and second magnetic poles are diamond-shaped.

In some embodiments, the at least one sensor further comprises a first protective bumper and a second protective bumper for preventing damage to the at least one sensor in the event of contact between the feedback device and the at least one sensor, the first bumper surrounding the first magnetic pole and the second bumper surrounding the second magnetic pole.

In some embodiments, the at least one sensor has a C-shaped cross section.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
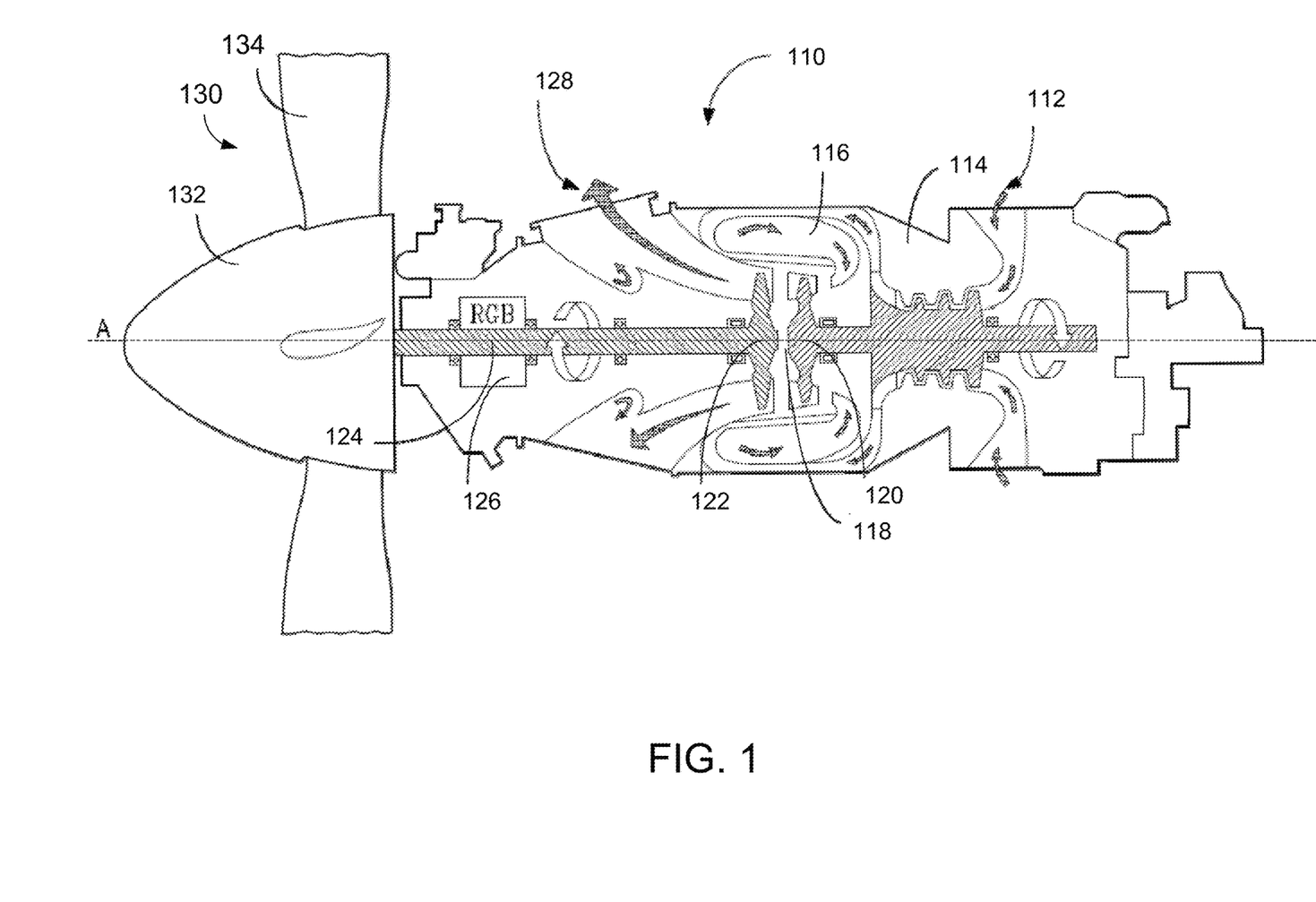
FIG. 1 is a schematic cross-sectional view of an example gas turbine engine, in accordance with an embodiment.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

Rotation of the output shaft 124 is facilitated by one or more bearing assemblies (not illustrated), which can be disposed within the RGB 126 or at any other suitable location. The bearing assemblies are electrically isolating during operation due to an oil film which is present at the bearing assemblies where they rotate.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to the hub 132 by any suitable means and extending radially therefrom. The blades 134 are also each rotatable about their own radial axes through a plurality of adjustable blade angles, which can be changed to achieve various modes of operation. The blade angle is the angle between the chord line (i.e. a line drawn between the leading and trailing edges of the blade 134) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

Figure 2:
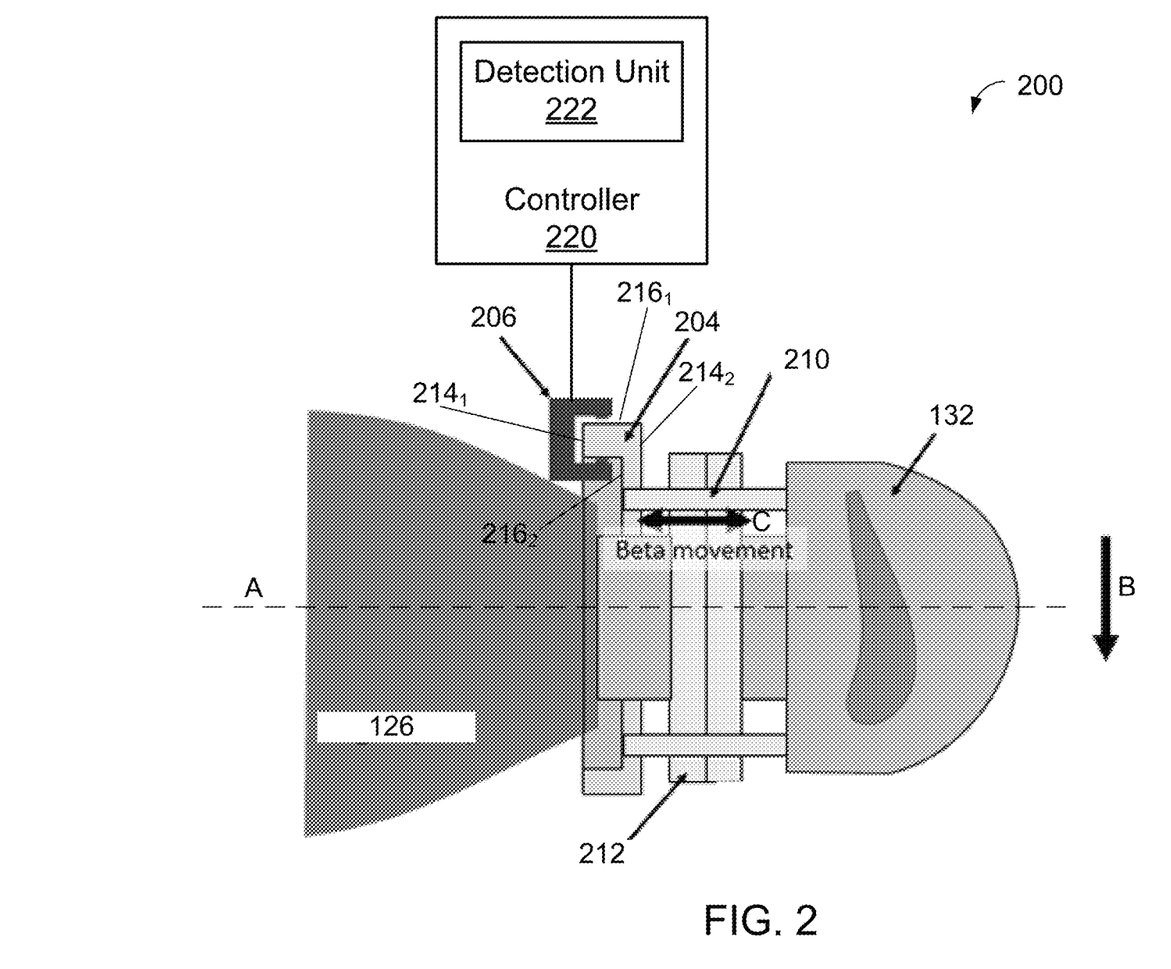
FIG. 2 is a schematic diagram of an example feedback sensing system, in accordance with an embodiment.
Figure 3A:
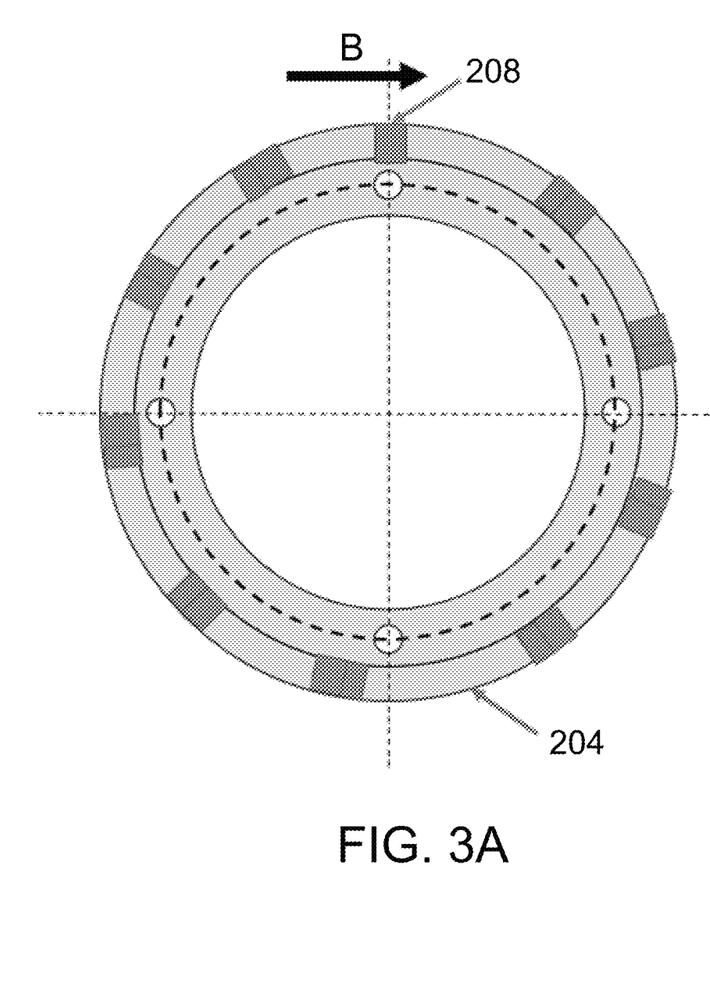
FIG. 3A and FIG. 3B respectively illustrate a schematic front view and a schematic top view of the feedback device of FIG. 2, in accordance with an embodiment.
Figure 3B:
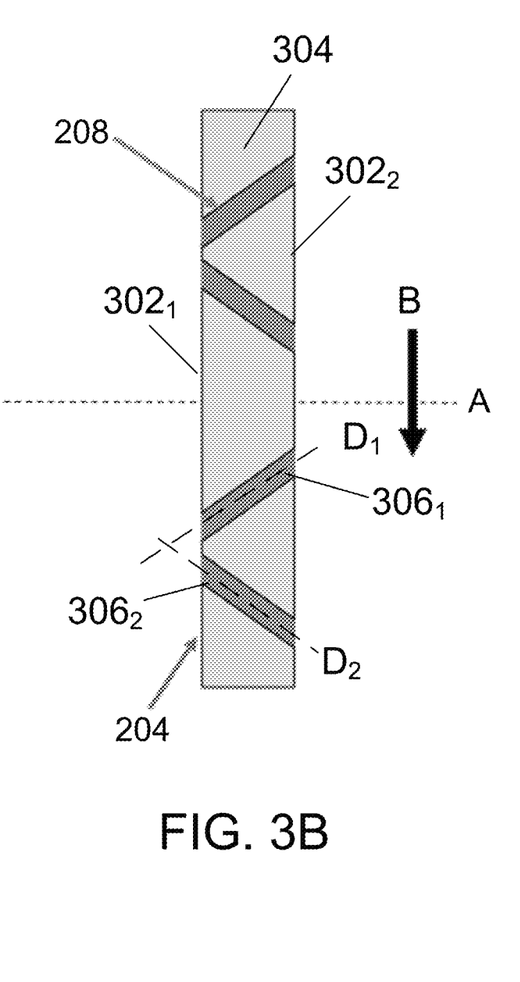

With reference to FIG. 2, FIG. 3A, and FIG. 3B, a feedback sensing system 200 for pitch-adjustable blades of bladed rotors of aircraft will now be described. The system 200 may be used for sensing a feedback device (also referred to as a feedback ring or phonic wheel) of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. In other embodiments, the system 200 may be used for synchronization of propeller blades on multiple propeller aircrafts. The system 200 may interface to existing mechanical interfaces of typical propeller systems to provide a digital detection for electronic determination of the propeller blade angle. It should be noted that, although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 206 positioned proximate the annular member 204. Annular member 204 (also referred to herein as a feedback device) is a non-magnetically permeable conductive ring made of any suitable non-magnetically conductive material, including, but not limited to, aluminum and Polyether ether ketone (PEEK). The feedback device 204 illustratively has a C-shaped cross-section, as shown in FIG. 2. The feedback device 204 has a plurality of detectable features 208 (also referred to herein as position markers) disposed circumferentially thereon for detection by sensor (s) 206. As will be discussed further below, the position markers 208 are magnetically permeable and are embedded within the feedback device 204, so as to be flush with a surface (not shown) thereof. The feedback device 204 may therefore comprise zones of different magnetic permeability, including zones (i.e. position markers 208) arranged to indicate propeller position via axial position of the feedback device 204.

In some embodiments, the feedback device 204 is mounted for rotation with the propeller 130, which rotates about the longitudinal axis 'A' (as illustrated by arrow 'B'). The feedback device 204 is also supported for longitudinal sliding (or 'beta') movement along the axis A (as illustrated by arrow 'C'). In other words, the feedback device 204 is supported to move axially with adjustment of the blade angle of the blades (reference 134 in FIG. 1) of the propeller 130, e.g. by support members, such as a series of circumferentially spaced feedback rods 210 that extend along the axis A. A compression spring (not shown) illustratively surrounds an end portion of each rod 210. The feedback rods 210 may be mounted to a flange 212, secured for example to a housing of the reduction gearbox 126 or to any other static element of the engine (reference 110 in FIG. 1), as appropriate.

In one embodiment, the one or more sensors 206 are fixedly mounted to a static portion of the engine 110. In other embodiments, the or more sensors 206 are mounted for rotation with the propeller 130 and to move axially with adjustment of the blade angle of the blades 134 of the propeller 130, and the feedback device 204 is fixedly mounted to a static portion of the engine 110. In some embodiments, a single sensor 206 is mounted in close proximity to the feedback device 204 and the position markers 208. In some other embodiments, one or more additional sensors, which may be similar to the sensor 206, are provided.

The system 200 also includes a controller 220 communicatively coupled to the sensor(s) 206. The one or more sensors 206 are configured for producing a sensor signal which is transmitted to or otherwise received by the controller 220, for example via a detection unit 222 thereof. The sensor signal can be an electrical signal, digital or analog, or any other suitable type of signal. In some embodiments, each sensor 206 produces a series of signal pulses in response to detecting the presence of a position marker 208 in a sensing zone of the sensor 206. For example, the sensor 206 is a variable reluctance magnetic sensor that operates on detecting changes in magnetic flux, and has a sensing zone which encompasses a circular or rectangular area or volume in front of the sensor 206. When a position marker 208 is present in the sensing zone, or passes through the zone during rotation of the feedback device 204, the magnetic flux in the sensing zone is varied by the presence of the position marker 208, and the sensor 206 can produce a signal pulse, which forms part of the sensor signal. Accordingly, the position markers 208 may be made of any suitable magnetically permeable material (e.g., a ferromagnetic material, Mu-Metal, or the like) which would cause the passage of the position markers 208 near the sensor 206 to provide a change in magnetic permeability within the magnetic field generated by the sensor 206. In addition, it should be understood that, although the sensor 206 is illustrated with straight lines, this need not be the case in all embodiments and the sensor 206 may have other suitable shape(s). The sensor 206 may for example be curve-shaped, which may allow to vary the sensitivity for axial position of the feedback device 204.

As shown in FIG. 3A and FIG. 3B, in some embodiments the feedback device 204 is embodied as a circular disk which rotates as part of the engine (reference 110 in FIG. 1), for example with the propeller shaft (reference 124 in FIG. 1) or with the propeller (reference 130 in FIG. 1). The feedback device 204 comprises opposing faces (references $214_1$, $214_2$ in FIG. 2) having outer edges $302_1$, $302_2$ and defines a root surface 304 which extends between the opposing faces $214_1$, $214_2$ and circumscribes them. Put differently, the root surface 304 of the feedback device 204 is the outer periphery of the circular disk which spans between the two opposing faces $214_1$, $214_2$ and the root surface 304 intersects the faces $214_1$, $214_2$ at the edges $302_1$, $302_2$. In these embodiments, the position markers 208 are embedded in the feedback device 204, flush with the root surface 304 such that the feedback device 204 has a substantially smooth or uniform root surface 304.

In one embodiment, the position markers 208 are integrally formed with the feedback device 204 so that the feedback device 204 may have a unitary construction. Each position marker 208 may be a portion of the feedback device 204 which is made of a different material, or to which is applied a layer of a different material. The position markers 208 may then be applied to the root surface 304, for instance as strips of material for detection by the sensor 206. The position markers 208 may be applied to the root surface 304 via bonding or any other suitable technique.

Still referring to FIG. 3A and FIG. 3B, the position markers 208 may comprise a plurality of first position markers $306_1$ arranged along a first direction (direction '$D_1$' in FIG. 3B) relative to the opposing faces $214_1$, $214_2$ of the feedback device 204 and substantially equally spaced from one another on the root surface 304. The position markers 208 may also comprise a plurality of second position markers $306_2$, each positioned between two adjacent first position markers $306_1$. Each second position marker $306_2$ is illustratively oriented along a direction '$D_2$', which is at an angle relative to the direction $D_1$ along which the first position markers $306_1$ are arranged. In this manner, the time of flight between passes of the sensor 206 varies with the axial position of the feedback device 204. The angle between the directions $D_1$ and $D_2$ can have any suitable value between 1° and 89°, for example 30°, 45°, 60°, or any other value, as appropriate. The angle between the directions $D_1$ and $D_2$ as well as the number of pairs of position markers $306_1$, $306_2$ may be determined based on a number of factors including, but not limited to, processing speed (e.g., of the controller 220), required update rate, selected gap (or distance) between the sensor 206 and the feedback device 204, pole piece dimensions, overall magnetic circuit considerations, axial travel to be measured, and rotor diameter.

In one embodiment, all position markers $306_1$ may be oriented along the same direction $D_1$ and all position markers $306_2$ may be oriented along the same direction $D_2$, such that the angle between the directions $D_1$ and $D_2$ remains substantially the same around the circumference of the feedback device 204 (as illustrated in FIG. 3B). It should however be understood that other embodiments may apply. Indeed, in another embodiment, the angle between the directions $D_1$ and $D_2$ may be varied at each pair of position markers $306_1$, $306_2$. For example, the angle between the directions $D_1$ and $D_2$ may be varied (e.g., by a predetermined amount) for each successive pair of position markers $306_1$, $306_2$. In this manner, the time of flight (as the sensor 206 passes adjacent a pair of position markers $306_1$, $306_2$) varies with the axial position of the feedback device 204. Still, any suitable combination of positions for pairs of position markers $306_1$, $306_2$ or individual position markers $306_1$, $306_2$ may apply. In one embodiment, asymmetric features may further permit marking a particular position (also referred to as a "rotor position" or "index"), such as the "12 o'clock" position of the rotor, which can be useful for balance monitoring. Varying the angular position or divergence of pairs of position markers $306_1$, $306_2$ may also be used to detect wobble or axial runout of the feedback device 204.

As shown in FIG. 3B, each position marker $306_1$, $306_2$ extends axially (along longitudinal direction $D_1$ for position marker $306_1$ and along longitudinal direction $D_2$ for position marker $306_2$), from a first axial end or termination (not shown) to a second termination (not shown), which is opposite the first termination. Each termination is adjacent a corresponding edge $302_1$, $302_2$ of the feedback device 204. In other words, the position markers $306_1$, $306_2$ extend between the opposing faces $214_1$, $214_2$ of the feedback device 204, while maintaining the smooth surface of the feedback device 204, from one edge $302_1$, $302_2$ to the other. Each position marker $306_1$, $306_2$ has a substantially rectangular profile (with substantially parallel longitudinal edges, not shown) when viewed from the direction of the magnetic field generated by the sensor 206.

In some embodiments, the feedback device 204 includes only a single second position marker $306_2$ while, in other embodiments, the feedback device 204 can include more than one second position marker $306_2$. Each second position marker $306_2$ can be located at substantially a midpoint between two adjacent first position markers $306_1$ or can be located close to a particular one of two adjacent first position markers $306_1$ (as shown in FIG. 3A and FIG. 3B).

As described above, as the feedback device 204 rotates, varying portions thereof enter, pass through, and then exit the sensing zone of the sensor 206. The resulting signal pulses produced by the sensor 206, which form part of the electrical signal received by the control system 220, can be used to determine various operating parameters of the engine 110 and the propeller 130. For example, a speed of rotation of the feedback device 204 and a blade angle of the propeller 130 can be determined.

Figure 4A:
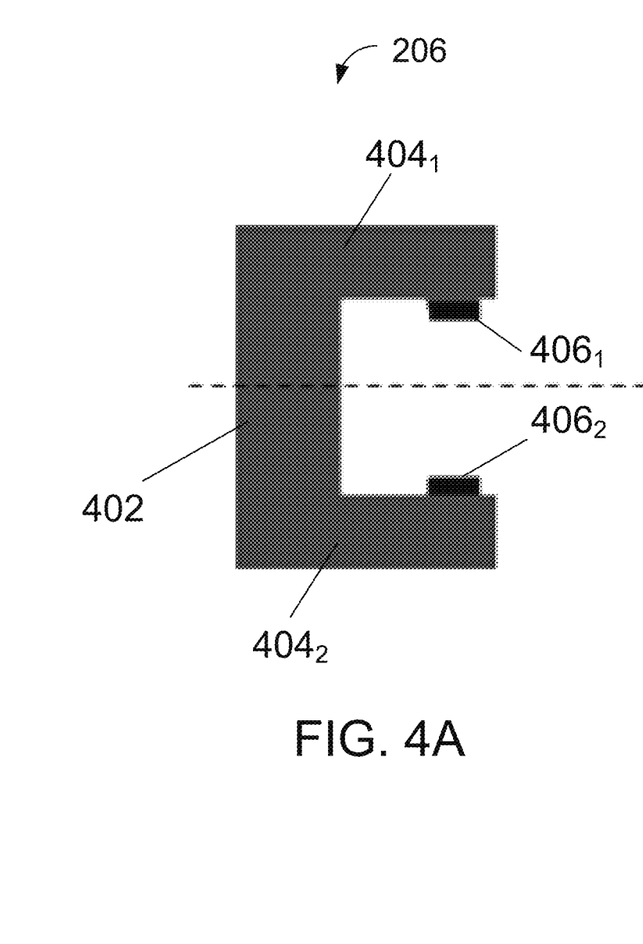
FIG. 4A and FIG. 4B respectively illustrate a schematic side view and a schematic front view of the sensor of FIG. 2, in accordance with an embodiment.
Figure 4B:
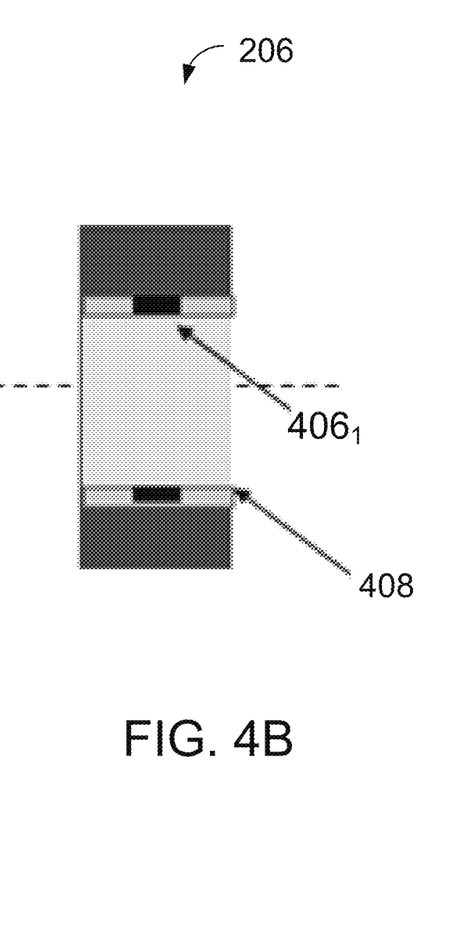
Figure 5A:
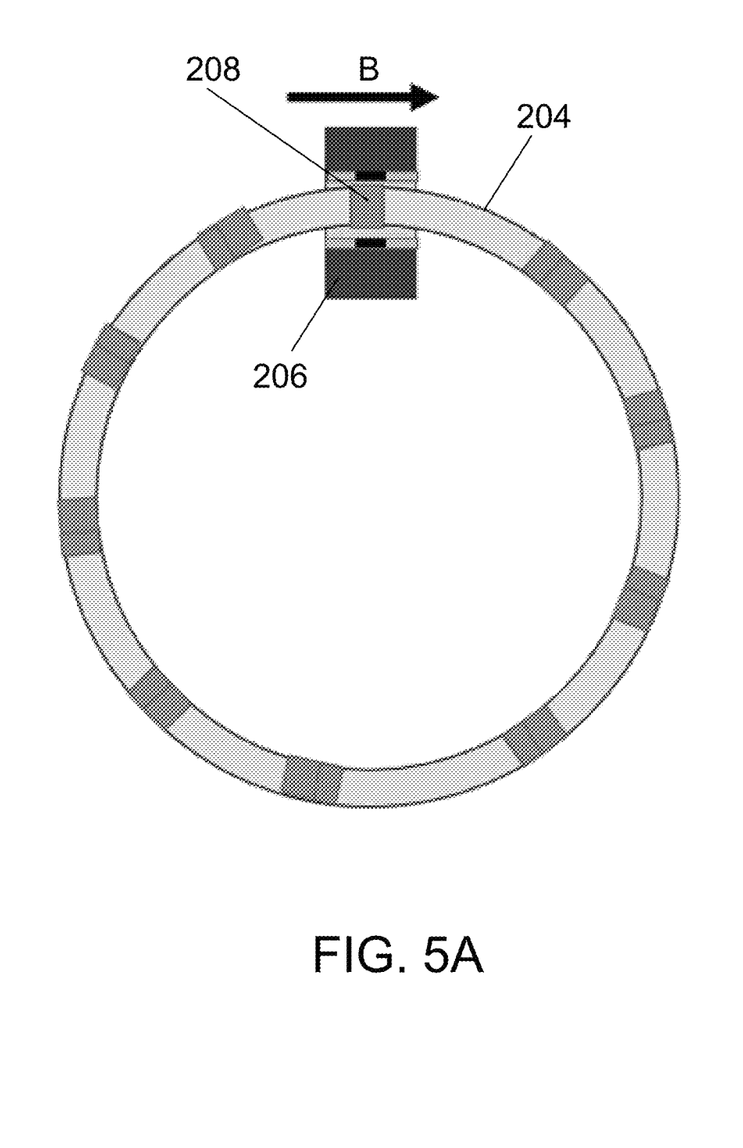
FIG. 5A is a schematic front view of the feedback device of FIG. 3A with the sensor of FIG. 4 positioned adjacent the feedback device, in accordance with an embodiment.
Figure 5B:
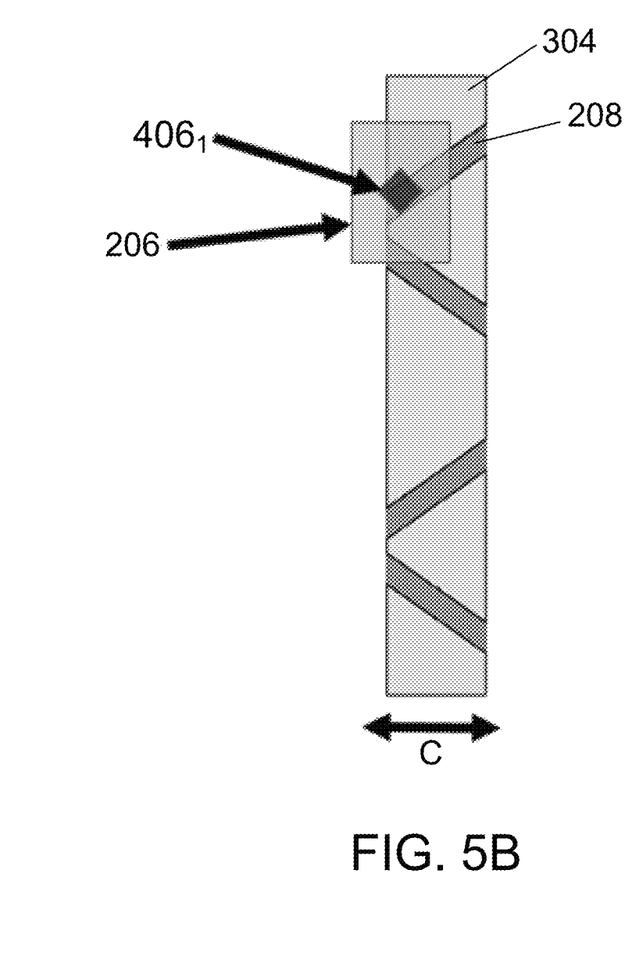
FIG. 5B is a schematic top view of the feedback device of FIG. 5A showing a pole piece of the sensor of FIG. 3A, in accordance with an embodiment.

Referring now to FIG. 4A and FIG. 4B, the configuration of the sensor 206 in accordance with one embodiment will be discussed in more detail. The sensor 206 comprises a body 402 that is generally C-shaped and has a first (or upper) end portion $404_1$ and a second (or lower) end portion $404_2$, the second end portion $404_2$ being opposite to and spaced from the first portion $404_1$. The sensor 206 further comprises two magnetic poles $406_1$, $406_2$, with the pole $406_1$ being provided at the first end portion $404_1$ and the pole $406_2$ being provided at the second end portion $404_2$. Each magnetic pole $406_1$, $406_2$ is illustratively shaped and oriented so as to align with a given position marker 208 as the feedback device 204 is displaced. This in turn minimizes pole shading, which relates to the effect of a portion of the magnetic flux being conducted through adjacent position markers 208 and results in a less defined change in sensor signal (i.e. in a diluted signal) as a given position marker 208 passes the pole $406_1$, $406_2$. Indeed, as illustrated in FIG. 5A and FIG. 5B, the sensor 206 is mounted relative to the feedback device 204 such that the poles $406_1$, $406_2$ are on either side of the feedback device 204 (i.e. on either side of the root surface 304), in a spaced relationship therewith. As a result, when the poles $406_1$, $406_2$ are shaded by a position marker 208 as the feedback device 204 is displaced, a small total air gap may be experienced. Large and fast changes of flux may then be created within the magnetic circuit, so as to obtain a desired sensor signal.

In one embodiment, the sensor 206 further comprises two protective bumpers as in 408, each protective bumper 408 surrounding a given pole piece $406_1$, $406_2$ such that any deflection which may occur (with the feedback device 204 or the sensor 206) will not result in a destructive contact between the feedback device 204 and the sensor 206. The protective bumpers 408 may prevent any galling or damage to the sensor 206 if such a contact were to occur. The protective bumpers 508 may be made of any suitable material. In one embodiment, the protective bumpers 508 may be made from a low friction impact resistant material including, but not limited to, Teflon, Vespel™ Nylon, brass, and other sintered metals where the filler is a lubricant such as oil, graphite, Teflon, and Molybdenum Disulfide ($MoS_2$). In another embodiment where the rotor (and accordingly the feedback device 204) is made of Vespel™, the protective bumpers 508 may be made of ceramic composites suited for intermittent operation against Vespel™. The choice of the material for the protective bumpers 508 may depend on factors including, but not limited to, avoiding fracture, ignition, high friction, and related undesired events to allow momentary contact with minimal damage and wear.

In operation, the sensor 206 provides a completed (or closed) magnetic flux circuit, where the upper pole $406_1$ can be said to emit the magnetic flux and the bottom pole $406_2$ to receive the magnetic flux. A closed magnetic path is indeed created when the position markers 208 pass through the poles $406_1$, $406_2$ as the feedback device 204 rotates. It should be noted that the total air gap of the magnetic circuit is substantially equal to the sum of the spacing (or airgap) between an outer surface (reference $216_1$ in FIG. 2) of the feedback device 204 and the upper pole $406_1$ and the spacing between an inner surface (reference $216_2$ in FIG. 2) of the feedback device 204 and the bottom pole $406_2$. It can therefore be seen that, in one embodiment, the total airgap remains substantially constant as the position of the feedback device 204 varies. There is accordingly less variation in signal strength, as may arise due to different thermal expansions, dimensional runout of the feedback device 204, and vibration. As such, the signal amplitude is increased and the clarity of the definition of the waveform of the sensor signal received at the controller (reference 220 in FIG. 2) is improved as a given position marker 208 passes a given pole $406_1$, $406_2$ (referred to herein as a "position marker passing" or "on" state).

In one embodiment, the spacing between the poles $406_1$, $406_2$ is set (i.e. the poles $406_1$, $406_2$ are sufficiently close and the feedback device 204 is suitably thin) such that a significant magnetic flux is transferred even when the position markers 208 are not positioned adjacent the poles $406_1$, $406_2$ (i.e. when the non-magnetically permeable portions of the feedback device 204 pass through the poles $406_1$, $406_2$, referred to herein as a "non-shaded portion of operation" or "off" state). A relatively closed magnetic path is therefore created in the "off" state. In one embodiment, by having significant magnetic flux transfer in both the "on" and "off" states, the state changes may have a pronounced and distinct shape in the resulting waveform. In addition, since a failed sensor 206 or pole $406_1$, $406_2$ would result in an open flux circuit, the proposed configuration may provide for an additional means of error proofing.

In one embodiment, optimization of the sensor signal waveform may also be achieved by ensuring that the poles $406_1$, $406_2$ of the sensor 206 are far from saturation and otherwise working to minimize stray field. Indeed, if the sensor 206 is arranged with a magnet that is too strong for the flux guides (i.e. the poles $406_1$, $406_2$ of the sensor 206), extra magnetic flux will overflow from the sensor body and may flow away from the sides of the poles $406_1$, $406_2$ (i.e. magnetic flux lines may not be constrained only at the gap between the sensor 206 and the feedback device 204). The stray magnetic flux may then find a path, leading to a partial circuit and a partial, but unwanted, signal being formed. In one embodiment, it is proposed herein to ensure that the poles $406_1$, $406_2$ are able to carry substantially all of the magnetic flux, such that more magnetic flux flows away from the poles $406_1$, $406_2$ and into the position markers $306_1$, $306_2$, with a crisp transition. As such, the expected shape of the magnetic flux lines in the non-shaded portion of operation may be reasonably constrained, so that position markers 208 that are advancing towards and departing from the sensor 206 do not conduct large amounts of magnetic flux. The resulting sensor signal may therefore be as near to a square wave as possible.

Optimization of the sensor signal waveform may further be achieved by providing poles $406_1$, $406_2$ with diamond-shaped ends, as shown in FIG. 5B. The poles $406_1$, $406_2$ may be shaped to replicate the angles on the position markers 208, and oriented such that the poles $406_1$, $406_2$ align with each position marker 208 as the position marker 208 passes through the sensor 206. As previously described, the position markers 208 may also be shaped with substantially razor sharp parallel faces and edges (not shown), so as to create fast magnetic rates of change of permeability. This in turn creates steep signal slopes (as the position markers 208 pass within the sensing zone of the sensor 206), thereby allowing to obtain more accurate measurement of axial position (hence beta angle) and greater precision of speed calculation.

Figure 6:
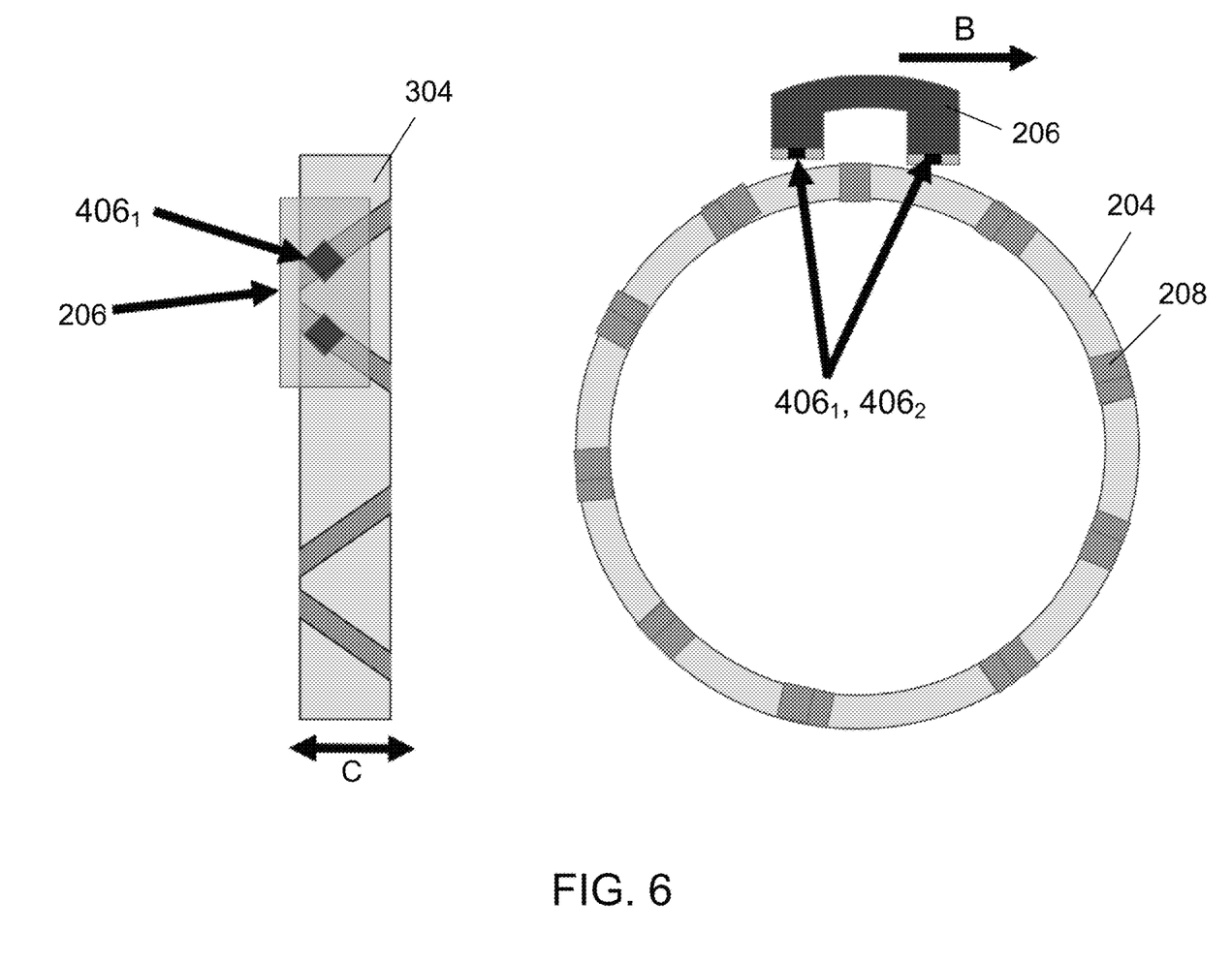
FIG. 6 illustrates a schematic diagram of a sensor, in accordance with another embodiment.

In one embodiment, the C-shaped sensor 206 may be substituted for a so-called "dual tip" (or "bi-polar") probe (not shown) having one tip corresponding to magnetic north and another tip corresponding to magnetic south. The C-shaped sensor 206 may also be replaced with a dual tip probe having an alternating magnetic signal induced between the poles. In other words, the sensor 206 may have an upside-down U-shaped cross-section (rather than a C-shaped cross-section), as shown in FIG. 6 (where the spacing of the poles $406_1$, $406_2$ of the sensor 206 is illustratively the same as the spacing of the position markers 208). In yet another embodiment, the variable reluctance magnetic sensor 206 may be replaced with an optical probe, a Hall-effect sensor, or any other suitable sensor capable of detecting the passage of the position markers 208.

In one embodiment, the proposed feedback sensing system 200 may be configured to produce electrical power. There may indeed be a use for generated power to perform work, such as de-ice an engine inlet sensor. The power generated may then be used to either supplement or replace a permanent magnet alternator (PMA) typically driven by the engine 110. The creation of steep changes of magnetic flux conduction and the use of small air gaps at the shaded portion along with permeable materials in the magnetic circuit may also allow to provide signal power. The signal power may in turn be exploited in terms of obtaining advantageous signal to noise levels for system robustness, thus requiring less shielding to attain an intended immunity from high-intensity radiated field (HIRF) and related threats. The signal power generated by the feedback device 204 and sensor 206 may also result in only minimal amplification being required within the sensor 206, resulting in a less expensive and fragile sensor 206, while reducing the susceptibility of the sensor signal to electromagnetic interference and distortion.

Unwanted ambient electromagnetic noise may be further passively cancelled through the use of dual coils and magnets at the sensor 206. For example, a first coil (not shown) may be wrapped on one end portion (reference $404_1$ in FIG. 4A) of the C-shaped sensor body (reference 402 in FIG. 4A) and a second coil (not shown) may be wrapped on the other end portion (reference $404_2$ in FIG. 4A) of the sensor body 702. The coils may be wound in opposite directions and polarity so their signals add together. Any electromagnetic pulse travels through the coils would then be cancelled.

Moreover, because the proposed arrangement permits for a smooth feedback device 204 (and sensor 206) configuration, all operating surfaces of the feedback device 204 (and of the sensor 206) may be coated with abrasion resistant and low friction material. Momentary contact, such as from hard landings, bird strike, and the like, may become tolerable and any risk of catastrophic collision with the sensor 206 may be reduced. The smooth feedback device 204 may further allow the sensor 206 to comprise glides, rollers, skids, or any other such feature so as to accommodate collision events as may arise after hard landings, bird strike, ground strike, lightning blast compression wave, weapons fire, or the like. The configuration of the feedback device 204 and sensor 206 may further allow for suspension-like features to be incorporated in (either intrinsic to or arranged in a mount of) the sensor 206 to accommodate for distortion or deflection that may arise from sustained turns due the gyroscopic forces on the propeller 130.

In one embodiment, due to the availability of permeable alloys (e.g., Permendur) and magnets of great energy product (e.g., samarium-cobalt (Sa—CO) or other rare earth types), it becomes possible for the sensor 206 to be made small relative to typical small gas turbine variable reluctance probes. The position markers 208 may also be made small, thus permitting to decrease the weight of the overall system. The configuration of the position markers 208 may also allow them to be traded for many samples per revolution without magnetic crosstalk (or interference). Magnetic crosstalk between position markers 208 may indeed tend to occur if the position markers 208 are spaced too closely, such that magnetic flux lines begin to flow to two position markers 208 when the sensor 206 is positioned between the position markers 208. This creates a design space limit. Hence, it can be seen that the smaller the sensor poles $406_1$, $406_2$, and the smaller the position markers 208, the more position markers 208 can be placed on a given rotor before crosstalk becomes a problem. In one embodiment, it may be desirable to provide several position markers 208 (rather than providing fewer position markers 208) in order for more samples per revolution, and accordingly more samples per unit time for a given rotor at a given speed, to be obtained. As a result, it may be possible to calculate speed, position, and rate of change of speed and position sooner, which may in turn provide system control advantages. The proposed arrangement may also facilitate the use of non-metallic materials (e.g., durable high-performance polyimide-based plastics like Vespel™) for the feedback device 204.

From the above description, it can also be seen that the position markers 208 are relatively slender with large surface area and low weight, thus allowing them to be readily bonded onto a feedback device 204 made of aluminum or any other suitable non-magnetically permeable alloy, without any challenging bond or retention tasks. The proposed arrangement may also make it possible to manufacture the feedback device 204 using three-dimensional (3D) printing using 3D printed permeable media, allowing the feedback device 204 to be manufactured with reduced machining time and resources. Other suitable manufacturing techniques may apply.

In one embodiment, the feedback device 204 may be 3D printed with position markers 208 made of ferritic resin being printed in the feedback device 204. A one piece feedback device 204 may therefore be printed from at least two powders, one which is structural and not magnetically permeable (e.g., to form the feedback device 204 itself) and another that is highly magnetically permeable (e.g., to form the position markers 208). Such a 3D printed feedback device 204 would be expected to be able to withstand considerable strain without rupture and to have low weight compared to feedback devices made from magnetic steel.

Referring back to FIG. 1 in addition to FIG. 2, as the output shaft 124 rotates, electrical charge generates on the output shaft 124. For example, the output shaft 124 can be struck by lightning or other electrical discharges, or can be subjected to triboelectric charge accumulation. In one embodiment, the proposed configuration for the feedback device 204, as described herein, may allow to prevent lightning strikes on the feedback device 204. Indeed, the fact that the feedback device 204 may be made from non-electrically conductive materials (e.g., PEEK) prevents electrical discharge to the feedback device 204. In particular, the proposed configuration of the feedback device 204 prevents the possibility for lightning to be conducted from a propeller attachment to the feedback device and then to the sensor 206 or other point on the engine 110.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback assembly for a rotor of an aircraft, the rotor rotatable about a longitudinal axis and having blades each rotatable about a span-wise axis to adjust a blade pitch angle thereof, the feedback assembly comprising:
    a feedback device having a root surface;
    a plurality of position markers circumferentially disposed on the root surface, the plurality of position markers circumferentially spaced from one another and non-aligned with the longitudinal axis; and
    at least one sensor configured to detect movement of the plurality of position markers relative to the at least one sensor as the rotor rotates about the longitudinal axis, the at least one sensor comprising a first magnetic pole and a second magnetic pole opposite the first magnetic pole, the first and second magnetic poles positioned on either side of the root surface.

2. The feedback assembly of claim 1, wherein the plurality of position markers comprises a first plurality of position markers circumferentially spaced from one another and oriented along a first direction, and at least one second position marker positioned between two adjacent first position markers and oriented along a second direction angled relative to the first direction.

3. The feedback assembly of claim 1, wherein the feedback device comprises a body made of a non-magnetically permeable material and the plurality of position markers are made of a magnetically permeable material.

4. The feedback assembly of claim 3, wherein the plurality of position markers are embedded in the feedback device.

5. The feedback assembly of claim 1, wherein the at least one sensor comprises a first end section and a second end section opposite the first end section, the first magnetic pole provided at the first end section and the second magnetic pole provided at the second end section.

6. The feedback assembly of claim 5, wherein the first and second magnetic poles are configured to align with any given one of the plurality of position markers as the given position marker passes through the sensor.

7. The feedback assembly of claim 5, wherein the first and second magnetic poles are diamond-shaped.

8. The feedback assembly of claim 5, wherein the at least one sensor further comprises a first protective bumper and a second protective bumper for preventing damage to the at least one sensor in the event of contact between the feedback device and the at least one sensor, the first bumper surrounding the first magnetic pole and the second bumper surrounding the second magnetic pole.

9. The feedback assembly of claim 1, wherein the at least one sensor has a C-shaped cross section.

10. The feedback assembly of claim 1, wherein the feedback device is coupled to rotate with the rotor about the longitudinal axis, and the at least one sensor is mounted adjacent to the feedback device to detect a passage of the plurality of position markers as the feedback device rotates.

11. A bladed rotor system for an aircraft, comprising:
    a rotor rotatable by a shaft about a longitudinal axis, the rotor having blades with adjustable blade pitch angle;
    a feedback device for detecting at least the blade pitch angle of the blades of the rotor, the feedback device having
    a root surface, and
    a plurality of position markers circumferentially disposed on the root surface, the plurality of position markers circumferentially spaced from one another and non-aligned with the longitudinal axis; and
    at least one sensor configured to detect movement of the plurality of position markers relative to the at least one sensor as the rotor rotates about the longitudinal axis, the at least one sensor comprising a first magnetic pole and a second magnetic pole opposite the first magnetic pole, the first and second magnetic poles positioned on either side of the root surface.

12. The system of claim 11, wherein the plurality of position markers comprises a first plurality of position markers circumferentially spaced from one another and oriented along a first direction, and at least one second position marker positioned between two adjacent first position markers and oriented along a second direction angled relative to the first direction.

13. The system of claim 11, wherein the feedback device comprises a body made of a non-magnetically permeable material and the plurality of position markers are made of a magnetically permeable material.

14. The system of claim 13, wherein the plurality of position markers are embedded in the feedback device.

15. The system of claim 11, wherein the feedback device is coupled to rotate with the rotor, and further wherein the at least one sensor is mounted adjacent the feedback device and configured to detect a passage of the plurality of position markers as the feedback device rotates.

16. The system of claim 15, wherein the at least one sensor comprises a first end section and a second end section opposite the first end section, the first magnetic pole provided at the first end section and the second magnetic pole provided at the second end section.

17. The system of claim 16, wherein the first and second magnetic poles are configured to align with any given one of the plurality of position markers as the given position marker passes through the sensor.

18. The system of claim 16, wherein the first and second magnetic poles are diamond-shaped.

19. The system of claim 16, wherein the at least one sensor further comprises a first protective bumper and a second protective bumper for preventing damage to the at least one sensor in the event of contact between the feedback device and the at least one sensor, the first bumper surrounding the first magnetic pole and the second bumper surrounding the second magnetic pole.

20. The system of claim 11, wherein the at least one sensor has a C-shaped cross section.

* * * * *